(12) United States Patent
Kim (10) Patent No.: US 8,284,547 B2
(45) Date of Patent: Oct. 9, 2012

(54) DISPLAY APPARATUS AND METHOD FOR ASSEMBLING THE SAME

(75) Inventor: Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 482 days.

(21) Appl. No.: 12/156,231

(22) Filed: May 29, 2008

(65) Prior Publication Data

US 2009/0122475 A1    May 14, 2009

(30) Foreign Application Priority Data

Nov. 8, 2007  (KR) ............... 10-2007-0113460

(51) Int. Cl.
  *G06F 1/16* (2006.01)
  *H05K 5/00* (2006.01)
  *H05K 7/00* (2006.01)
  *G02F 1/1333* (2006.01)

(52) U.S. Cl. ............... 361/679.21; 349/58; 349/110; 313/582

(58) Field of Classification Search ........... 361/679.21, 361/679.22; 313/582; 349/58–60, 110
  See application file for complete search history.

(56) References Cited

U.S. PATENT DOCUMENTS

| | | | | |
|---|---|---|---|---|
| 5,233,451 A * | 8/1993 | Iguchi | | 349/160 |
| 5,398,128 A * | 3/1995 | Tajima et al. | | 349/150 |
| 5,729,310 A * | 3/1998 | Horiuchi et al. | | 349/62 |
| 5,835,179 A * | 11/1998 | Yamanaka | | 349/161 |
| 5,870,160 A * | 2/1999 | Yanagawa et al. | | 349/141 |
| 5,966,191 A * | 10/1999 | Lee | | 349/58 |
| 6,313,891 B1 * | 11/2001 | Nagakubo et al. | | 349/65 |
| 6,549,263 B1 * | 4/2003 | Kim | | 349/58 |
| 6,777,621 B2 * | 8/2004 | Ishikawa et al. | | 174/260 |
| 6,816,213 B2 * | 11/2004 | Kato et al. | | 349/58 |
| 6,897,912 B2 * | 5/2005 | Kawakami et al. | | 349/61 |
| 6,967,701 B1 * | 11/2005 | Kim | | 349/122 |
| 7,023,504 B2 * | 4/2006 | Miyashita et al. | | 349/58 |
| 7,106,317 B2 * | 9/2006 | Kim et al. | | 345/206 |
| 7,113,235 B2 * | 9/2006 | Tsukamoto | | 349/58 |
| 7,113,237 B2 * | 9/2006 | Nitto et al. | | 349/58 |
| 7,292,290 B2 * | 11/2007 | Miyagawa et al. | | 349/58 |
| 7,324,172 B2 * | 1/2008 | Yamazaki | | 349/58 |
| 7,414,681 B2 * | 8/2008 | Cho et al. | | 349/110 |
| 7,663,715 B2 * | 2/2010 | Jin et al. | | 349/73 |
| 7,667,784 B2 * | 2/2010 | Kim et al. | | 349/44 |
| 2001/0010569 A1 * | 8/2001 | Jin et al. | | 349/58 |
| 2002/0003592 A1 * | 1/2002 | Hett et al. | | 349/58 |
| 2003/0043310 A1 | 3/2003 | Cho | | |
| 2003/0133070 A1 | 7/2003 | Nam et al. | | |

(Continued)

OTHER PUBLICATIONS

European Search Report, EP 08005712.8-2205/2058691, May 19, 2009, 9 pages.

*Primary Examiner* — Adrian S Wilson
(74) *Attorney, Agent, or Firm* — Innovation Counsel LLP (57) ABSTRACT

In a display apparatus and a method for assembling the display apparatus, the display apparatus includes for an embodiment a backlight assembly, a lower receiving member, a display panel and an upper receiving member. The backlight assembly provides light. The lower receiving member receives the backlight assembly. The display panel is disposed over the backlight assembly. An end portion of the upper receiving member is disposed on a non-display area of the first substrate and protrudes between an end portion of the front case and the first substrate. The upper receiving member is combined with the lower receiving member and fixes the display panel. Thus, the display panel may be safely fixed (secured).

25 Claims, 6 Drawing Sheets

U.S. PATENT DOCUMENTS

| | | |
|---|---|---|
| 2003/0218700 A1 | 11/2003 | Tsukamoto |
| 2006/0055839 A1* | 3/2006 | Hirao et al. .................. 349/58 |
| 2006/0139271 A1* | 6/2006 | Okuda ......................... 345/88 |
| 2006/0238446 A1* | 10/2006 | Takahashi et al. ............ 345/55 |
| 2007/0008449 A1* | 1/2007 | Choi ............................ 349/58 |
| 2007/0132917 A1* | 6/2007 | Kim et al. .................... 349/65 |
| 2007/0222912 A1* | 9/2007 | Sato et al. .................... 349/58 |
| 2008/0002093 A1* | 1/2008 | Kim .............................. 349/58 |
| 2008/0158468 A1* | 7/2008 | Kim et al. .................... 349/58 |
| 2009/0109366 A1* | 4/2009 | Lippey ......................... 349/58 |

* cited by examiner

FIRST DIRECTION

SECOND DIRECTION

FIRST DIRECTION

DISPLAY APPARATUS AND METHOD FOR ASSEMBLING THE SAME

CROSS-REFERENCE TO RELATED APPLICATIONS

This application claims priority under 35 U.S.C. §119 to Korean Patent Application No. 2007-113460, filed on Nov. 8, 2007 in the Korean Intellectual Property Office (KIPO), the contents of which is herein incorporated by reference in its entirety.

BACKGROUND

1. Technical Field

The present invention relates generally to a display apparatus and a method for assembling the display apparatus. More particularly, the present invention relates to a display apparatus including a display panel and a method for assembling the display apparatus.

2. Description of the Related Art

A display panel used for a display apparatus includes a thin-film transistor (TFT) substrate and a color filter substrate facing the TFT substrate. A TFT is formed on the TFT substrate and a color filter is formed on the color filter substrate. Generally, the TFT substrate and the color filter substrate are manufactured by cutting apart two large-sized mother substrates that are attached to each other to maintain a certain distance between the two mother substrates. In this case, the TFT substrate includes an area to which a driving circuit to control the TFT is connected, and thus the TFT substrate may be larger than the color filter substrate.

Since the TFT substrate may be larger than the color filter substrate, the mother substrate used for the color filter substrate may have a portion that is partially useless and discarded when the two large-sized mother substrates attached to each other are cut apart to separate individual display panels. Thus, a size of the resulting display panel manufactured from the mother substrates may be undesirably decreased.

Various methods for manufacturing the display panel from the mother substrates are developed to increase the size of the display panel. However, although the size of the display panel is increased by using the various methods for manufacturing the display panel from the mother substrates, the display panel having an increased size may be hard to reliably fix (i.e., secure) using a conventional upper receiving member and a conventional front case. For example, the display panel may be easily detached by an external impact.

SUMMARY

Systems are disclosed, in accordance with one or more embodiments, that provide a display apparatus capable of fixing (securing) a display panel safely.

Embodiments of the present invention also provide methods for assembling the display apparatus.

As an example, a display apparatus includes a display panel having a first substrate and a second substrate disposed under the first substrate, and a front case covering the display panel, end portions of the first and second substrates being cut (or arranged) offset (i.e., in disagreement) with respect to each other, the display apparatus according to the present example embodiment further includes a backlight assembly, a lower receiving member, a display panel and an upper receiving member. The backlight assembly provides light. The lower receiving member receives the backlight assembly. The display panel is disposed over the backlight assembly. The upper receiving member combined with the lower receiving member fixes the display panel. An end portion of the upper receiving member is disposed (i.e., mounted) on a non-display area of the first substrate and protrudes between an end portion of the front case and the first substrate.

The display apparatus may further include a mold frame disposed between the lower receiving member and the upper receiving member, to support the display panel. In this case, the mold frame may include a first protrusion supporting the first substrate and a second protrusion supporting the second substrate.

The end portion of the upper receiving member may be protruded so that a distance from a display area of the first substrate to the end portion of the front case may be longer than the distance from the display area of the first substrate to the end portion of the upper receiving member.

A black matrix may be formed in the non-display area of the first substrate, and the end portion of the upper receiving member may overlap with the black matrix.

The end portion of the front case may have a reversed (e.g., downward) L shape, so that an end surface of the front case may face an upper surface of the end portion of the upper receiving member. In addition, the end portion of the upper receiving member may have an L shape (e.g., upward L shape), to correspond to the end portion of the front case.

The end portion of the upper receiving member may have a black surface. In this case, a black tape may be attached to the end portion of the upper receiving member to form the black surface. Alternatively, a powder may be coated on the end portion of the upper receiving member to form the black surface.

The display apparatus may further include a polarizing plate disposed on the first substrate. In this case, the end portion of the upper receiving member may be disposed on the polarizing plate, to fix the polarizing plate and the display panel. In addition, the end portion of the second substrate, the end portion of the first substrate, an end portion of the polarizing plate and the end portion of the upper receiving member may overlap with each other in a line.

In another example, a display apparatus includes a unit display panel having a first substrate and a second substrate disposed under the first substrate, and a front case covering a plurality of unit display panels combined with each other, end portions of the first and second substrates being cut (or arranged) offset with respect to each other, the display apparatus according to the present example embodiment further includes a backlight assembly, a lower receiving member, a tiled display panel and an upper receiving member. The backlight assembly provides light. The lower receiving member receives the backlight assembly. The tiled display panel disposed over the backlight assembly includes the plurality of unit display panels combined with each other. The upper receiving member combined with the lower receiving member fixes the tiled display panel. End portion of the upper receiving member is disposed on a non-display area of the first substrate and protrudes between an end portion of the front case and the first substrate.

The first substrate of the unit display panel may be disposed on the second substrate of an adjacent unit display panel, to form the tiled display panel.

In this case, the display apparatus may further include a mold frame disposed between the lower and upper receiving members and including a first protrusion and a second protrusion. The first protrusion may support the first substrate of a first outermost unit display panel, and the second protrusion may support the second substrate of a second outermost unit display panel. The first outermost unit display panel may be opposite to the second outermost unit display panel.

The end portion of the upper receiving member may protrude, so that a distance from a display area of the first outermost unit display panel to the end portion of the front case may be longer than the distance from the display area of the first outermost unit display panel to the end portion of the upper receiving member. In this case, a black matrix may be formed in the non-display area of the first substrate of the first outermost unit display panel, and the end portion of the upper receiving member may overlap with the black matrix.

As an example, a method for assembling a display apparatus including a display panel having a first substrate and a second substrate disposed under the first substrate, and a front case covering the display panel, end portions of the first and second substrates being cut (or arranged) offset with respect to each other, the method according to the present example embodiment further includes receiving a backlight assembly in a lower receiving member. The display panel is disposed over the backlight assembly. An upper receiving member is combined with the lower receiving member. An end portion of the upper receiving member is disposed on a non-display area of the first substrate, so as to fix the display panel using the upper receiving member. An end portion of the front case is disposed over the non-display area of the first substrate, so that the end portion of the upper receiving member protrudes between the end portion of the front case and the first substrate.

A mold frame having a first protrusion supporting the first substrate and a second protrusion supporting the second substrate may be disposed between the lower receiving member and the upper receiving member.

The end portion of the front case may be disposed over the non-display area of the first substrate by forming a distance from a display area of the first substrate to the end portion of the front case to be longer than the distance from the display area of the first substrate to the end portion of the upper receiving member.

The end portion of the front case may be disposed over the non-display area of the first substrate by disposing an end surface of the front case to face an upper surface of the end portion of the upper receiving member.

The method may further include disposing a polarizing plate on the first substrate. In this case, the display panel may be fixed using the upper receiving member by disposing the end portion of the upper receiving member on the polarizing plate.

According to an embodiment of the present invention, the end portions of the first and second substrates are cut from a mother substrate, offset with respect to each other, to make better use of mother substrates, so that a size of the display panel may be increased.

In addition, the end portion of the upper receiving member protrudes between the end portion of the front case and the first substrate, so that an area of the end portion of the upper receiving member disposed on the first substrate is increased. Thus, the display panel may be more safely fixed (e.g., secured) from an external impact.

In addition, the end portion of the upper receiving member has the black surface, so that the end portion of the upper receiving member may not be noticed, even if the end portion of the upper receiving member protrudes between the end portion of the front case and the first substrate. Thus, an enhanced image may be provided.

BRIEF DESCRIPTION OF THE DRAWINGS

The above and other features and advantages of embodiments of the present invention will become more apparent by describing in detailed example embodiments thereof with reference to the accompanying drawings, in which.

DESCRIPTION OF THE EMBODIMENTS

Embodiments of the invention are described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Figure 1:
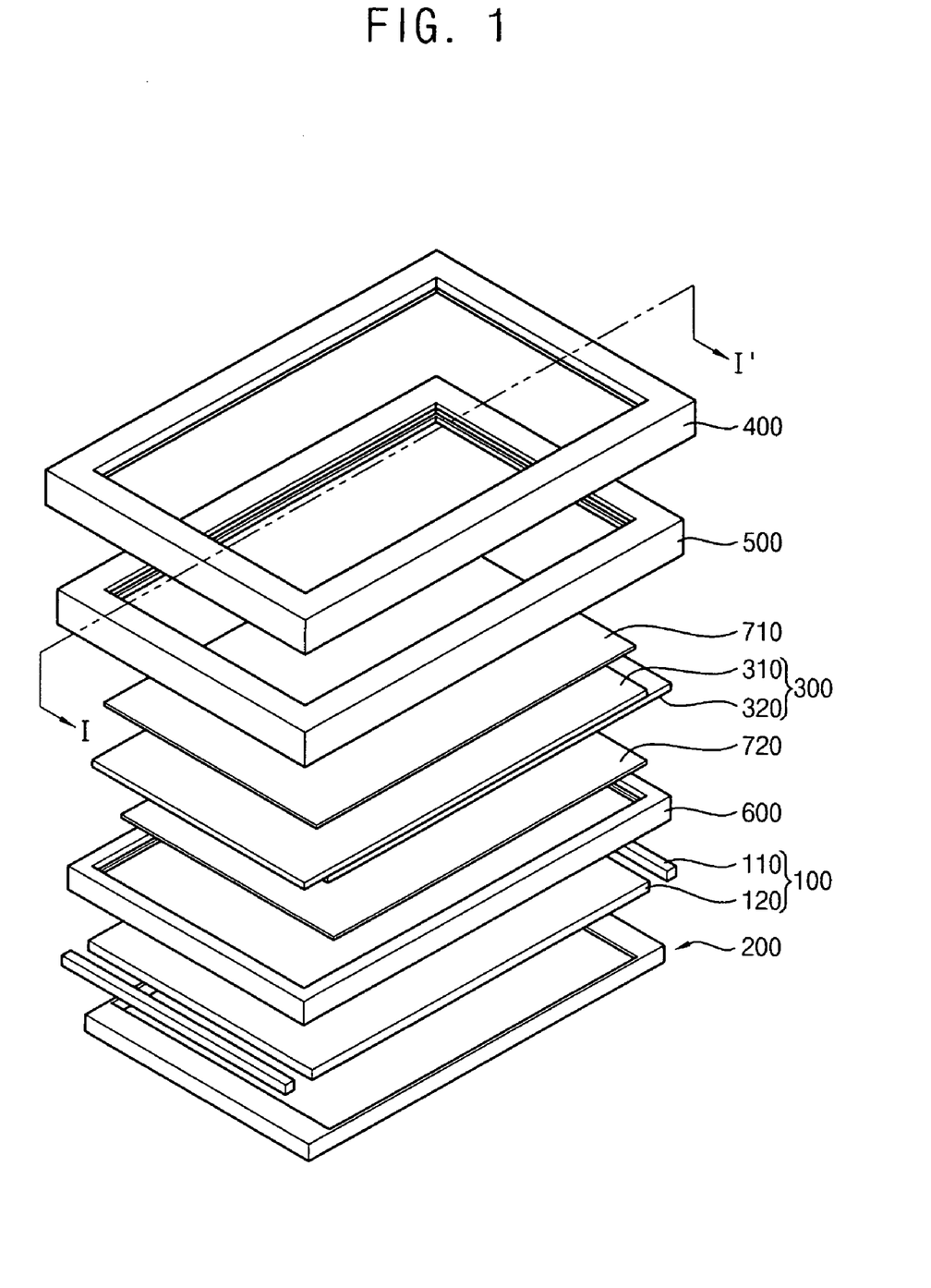
FIG. 1 is an exploded perspective view illustrating a display apparatus according to an example embodiment of the present invention.
Figure 2:
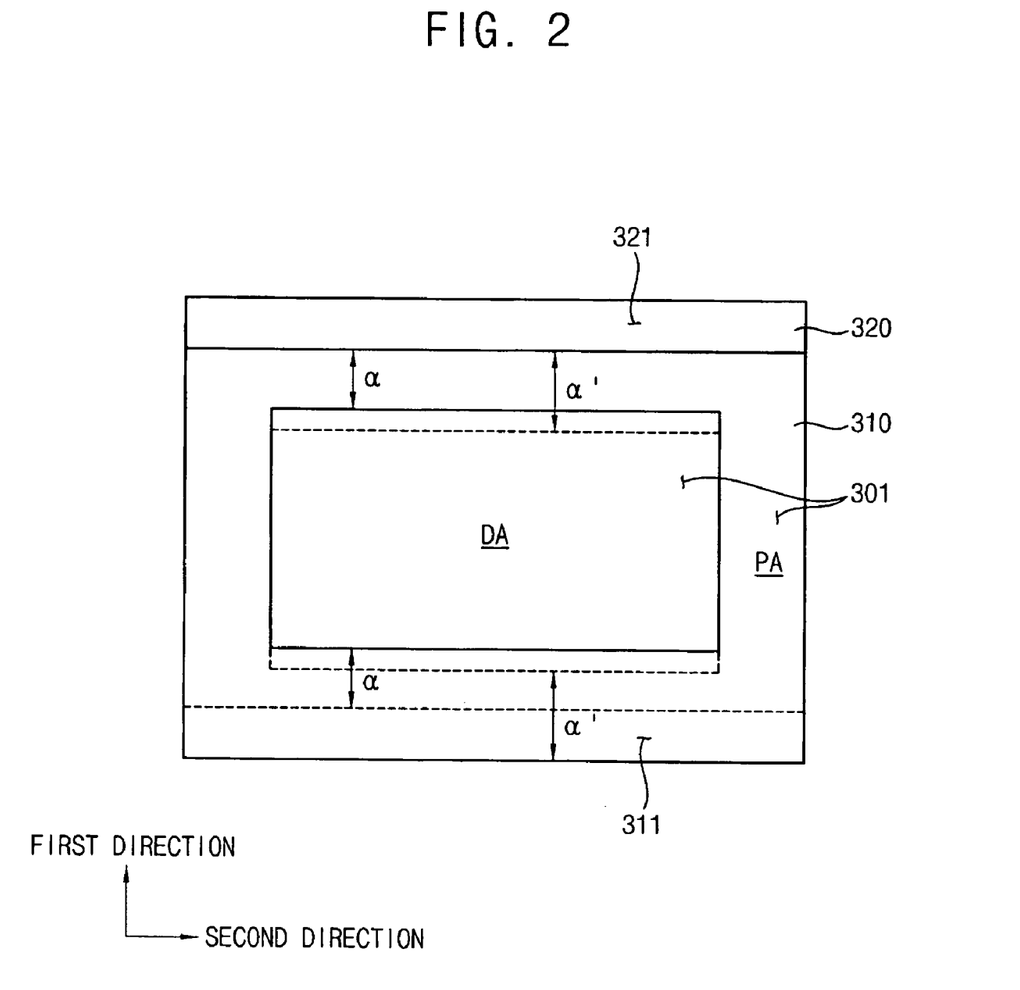
FIG. 2 is a plan view illustrating a display panel in FIG. 1.
Figure 3:
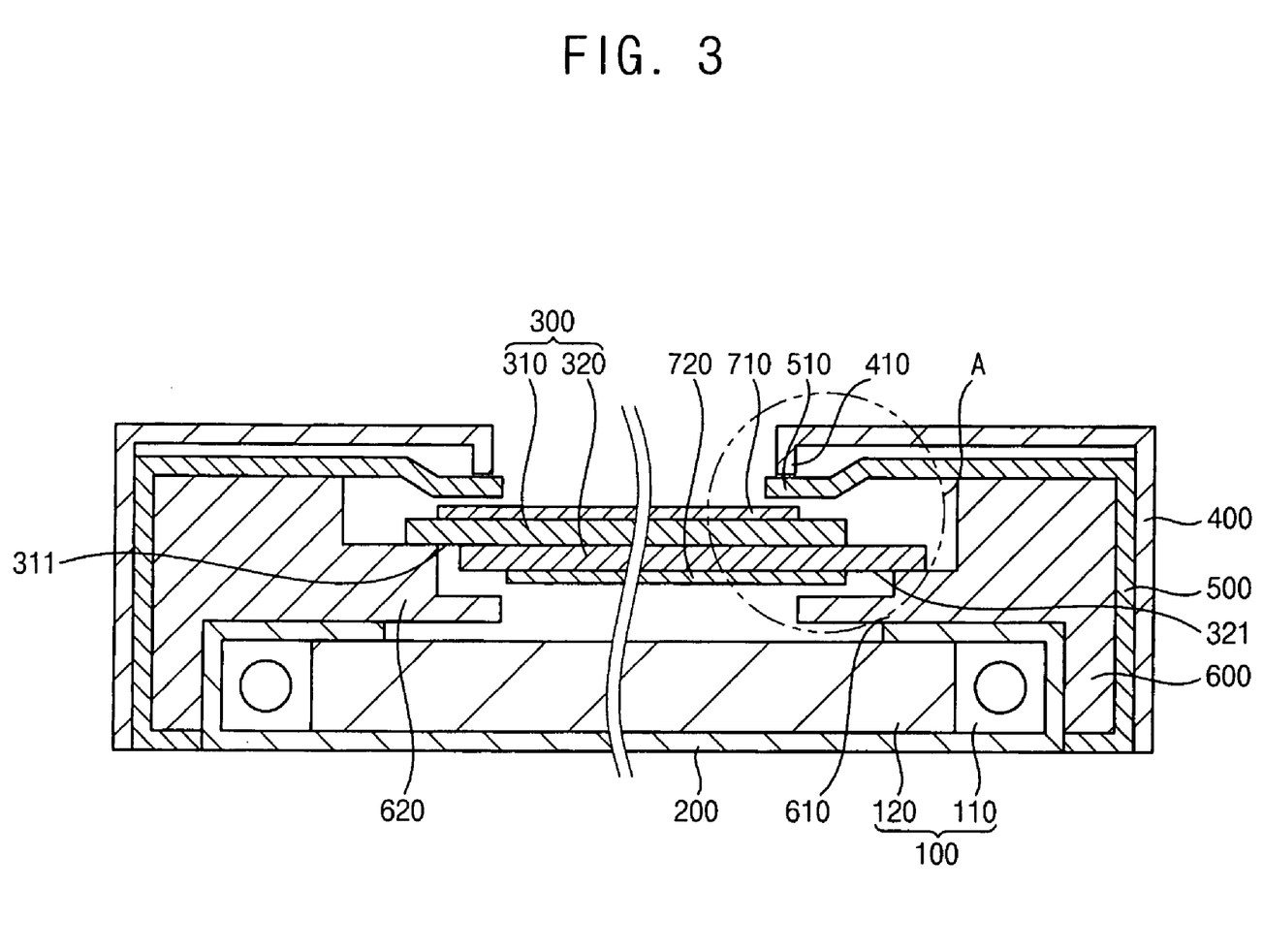
FIG. 3 is a cross-sectional view taken along a line I-I' of FIG. 1.

FIG. 1 is an exploded perspective view illustrating a display apparatus according to an example embodiment of the present invention. FIG. 2 is a plan view illustrating a display panel in FIG. 1. FIG. 3 is a cross-sectional view taken along a line I-I' of FIG. 1.

Referring to FIGS. 1 and 3, the display apparatus according to the present example embodiment includes a backlight assembly 100, a lower receiving member 200, a display panel 300, a front case 400 and an upper receiving member 500. The display apparatus may further include a mold frame 600 and first and second polarizing plates 710 and 720.

The backlight assembly 100 includes a light source unit 110 having a light source (not shown) emitting light and a cover portion (not shown) covering the light source, and a light guiding plate 120 guiding the light emitted from the light source to the display panel 300. As illustrated in FIG. 1, the light source unit 110 may be disposed at both ends of the light guiding plate 120, and alternatively may be disposed at one end of the light guiding plate 120. For example, the backlight assembly 100 may include various shapes of edge-illumination type backlight assemblies. Although not shown in the figure, the backlight assembly 100 may include a direct-illumination type backlight assembly having the light source disposed under a diffusion plate.

The lower receiving member 200 includes a bottom plate and a sidewall, to receive the backlight assembly 100.

The display panel 300 includes first and second substrates 310 and 320, and end portions of the first and second substrates 310 and 320 are arranged offset relative to each other. Although not shown in the figure, the display panel 300 includes a liquid crystal layer disposed between the first and second substrates 310 and 320, and a driving circuit board driving the display panel 300. The display panel 300 is disposed over the backlight assembly 100 to display an image using the light passing through the backlight assembly 100.

For example, the first substrate 310 includes a plurality of color filters (not shown) on which red, green and blue (RGB) pixels are formed to display a color. The second substrate 320 includes a plurality of pixel electrodes (not shown) each of which faces each of the color filters, a plurality of thin-film transistors (TFTs) each of which applies a driving voltage to each of the pixel electrodes, and signal lines (not shown) driving the TFTs. The liquid crystal layer (not shown) includes liquid crystal molecules, and an orientation direction of the liquid crystal molecules is changed to display various images.

The front case 400 is disposed over the display panel 300, to cover outsides of the lower receiving member 200 and the display panel 300. An end portion 410 of the front case 400 is disposed over the display panel 300, and will be described further below. For example, the front case 400 may include a plastic based material to decrease a weight of the display apparatus.

The upper receiving member 500 is combined with the lower receiving member 200 and the mold frame 600, and is disposed inside of the front case 400. For example, as illustrated in FIG. 3, a sidewall of the upper receiving member 500 is disposed inside of a sidewall of the front case 400 to be combined with the front case 400. In addition, the sidewall of the upper receiving member 500 may be combined with the sidewall of the lower receiving member 200 and a sidewall of the mold frame 600. In this case, the sidewall of the front case 400, the sidewall of the upper receiving member 500, the sidewall of the lower receiving member 200 and the sidewall of the mold frame 600 may be combined with each other in various combinations.

An end portion 510 of the upper receiving member 500 is disposed over the display panel 300, and will be described further below.

The mold frame 600 is disposed between the lower receiving member 200 and the upper receiving member 500, to be combined with the lower receiving member 200 and the upper receiving member 500. The mold frame 600 includes first and second protrusions 610 and 620 protruded from a central portion of the mold frame 600. The first and second protrusions 610 and 620 are disposed under the display panel 300, to support and fix the display panel 300.

The first polarizing plate 710 is disposed between the first substrate 310 of the display panel 300 and the upper receiving member 500. The first polarizing plate 710 polarizes the light passing through the display panel 300, so that the display panel 300 displays various images. The second polarizing plate 720 is disposed between the second substrate 320 of the display panel 300 and the backlight assembly 100. The second polarizing plate 720 polarizes the light provided from the backlight assembly 100 to emit the light to the display panel 300.

Although not shown in the figure, optical members may be disposed between the second substrate 320 of the display panel 300 and the backlight assembly 100, to enhance efficiency of the light provided from the backlight assembly 100.

Referring to FIG. 2, the first and second substrates 310 and 320 of the display panel 300 according to the present example embodiment are manufactured by cutting apart first and second mother substrates, respectively. For example, end portions of the first and second substrates 310 and 320 are formed offset with respect to each other, to decrease the amount of the mother substrates going to waste by virtue of unused substrate area and to increase a size of the display panel 300 that may be obtained from the mother substrates.

For example, one unit of the display panel 300 according to the present example embodiment includes an overlapping area 301 including a display area DA and a non-display area PA, a first non-overlapping area 311 and a second non-overlapping area 321. The overlapping area 301 is an area in which the first and second substrates 310 and 320 overlap with each other. The display area DA is formed in a central area of the overlapping area 301, to display the image. The non-display area PA is formed around the display area DA. For example, a black matrix is formed in the non-display area PA, and the non-display area PA is displayed with a black color, so that a contrast ratio may be enhanced.

A driving circuit (not shown) is connected to the second substrate 320 of the display panel 300, to drive the TFTs formed on the second substrate 320. For example, the second substrate 320 may be larger than the first substrate by a predetermined size, so that the driving circuit may be connected to the second substrate 320. Thus, when the first and second substrates 310 and 320 are formed from the first and second mother substrates, a portion of the first mother substrate for the first substrate 310 may go to waste by the predetermined difference in size of substrates 310 and 320.

Thus, as illustrated in FIG. 2, the first and second mother substrates are cut to manufacture the first substrate 310 including the first non-overlapping area 311 and the second substrate 320 including the second non-overlapping area 321, so that mother substrate material may be conserved. When a cutting method as mentioned above is used (e.g., a cross-cutting method), the size of the display panel obtained from the first and second mother substrates may be increased.

When the mother substrates are cut off using the cutting method to manufacture the first and second substrates 310 and 320, the first substrate 310 includes the first non-overlapping area 311 and the second substrate 320 includes the second non-overlapping area 321, so that a distance between the black matrices is α. For example, when the mother substrates are cut off along a first direction using the cutting method, the distance between the black matrices is decreased from α' to α. In this case, the distance between the black matrix formed over the first substrate and the black matrix formed under the first substrate is decreased from α' to α, because the first overlapping areas 311 are formed.

For example, when thirty-two unit display panels are disposed on a 19-inch wide monitor without using the cutting method, the first non-overlapping area 311 is not formed, so that the distance α' between the black matrices may be about 4.5 mm. However, when seven unit display panels are disposed along the first direction and thirty-five unit display panels are disposed on the 19-inch wide monitor using the cutting method, the first non-overlapping area 311 is formed, so that the distance a between the black matrices may be about 2.3 mm. Although not shown in the figure, the first and second mother substrates may also be cut off along a second direction substantially perpendicular to the first direction using the cutting method, and in this case, the distance between the black matrices may be also decreased.

Accordingly, when the distance between the black matrices is decreased from α' to α by using the cutting method for cutting the mother substrates, a ratio of the display area DA with respect to the non-display area PA may be increased. For example, even if the area of the display area DA is substantially same, the distance between both end portions of the front case 400 is decreased, so that total size of the display apparatus may be decreased. Thus, the display apparatus having a relatively smaller size of front case 400 may be manufactured.

However, when the distance between the black matrices is decreased, the display panel 300 is difficult to support and fix at upper outermost portions of the display panel 300 as will be described further below. Referring to FIG. 3 again, the first substrate 310 includes the first non-overlapping area 311 and the second substrate 320 includes the second non-overlapping area 321, and thus, the second protrusion 620 of the mold frame 600 makes contact with a lower surface of the first non-overlapping area 311 to support and fix the first non-overlapping area 311, and the first protrusion 610 of the mold frame 600 makes contact with a lower surface of the second non-overlapping area 321 to support and fix the second non-overlapping area 321.

Figure 4:
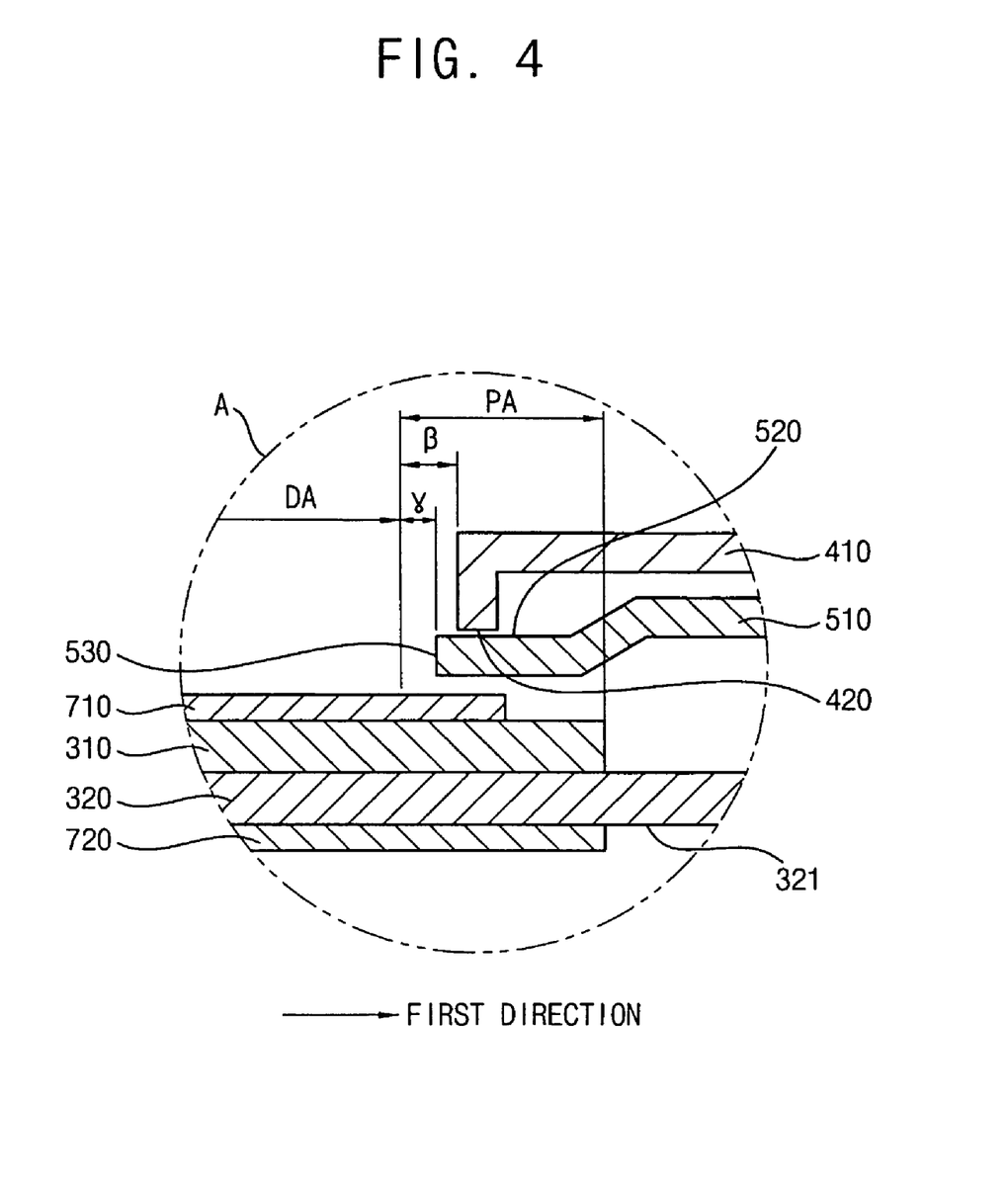
FIG. 4 is an enlarged view illustrating a portion A in FIG. 3.

FIG. 4 is an enlarged view illustrating a portion A in FIG. 3.

Referring to FIG. 4, the display panel 300 according to the present example embodiment is manufactured via the cutting method on the mother substrates, so that the first and second substrates 310 and 320 of the display panel 300 have respectively the first and second non-overlapping areas 311 and 321. Thus, when the display panel 300 is manufactured via the cutting method on the mother substrates along the first direction, an end portion of the second substrate 320 along the first direction includes the second non-overlapping area 321 that is protruded more than the first substrate 310.

Although not shown in the figure, when the display panel 300 is manufactured via the cutting method on the mother substrates along the second direction, an end portion of the second substrate 320 along the second direction includes the second non-overlapping area 321 that is protruded more than the first substrate 310.

Since the front case 400 and the upper receiving member 500 are disposed over the first substrate 310, an area in which the end portion 410 of the front case 400 and the end portion 510 of the upper receiving member 500 overlap with each other is larger in case the first substrate 310 is protruding more than the second substrate 320, than in case the second substrate 320 is protruding more than the first substrate 310. In addition, the end portion 410 of the front case 400 and the end portion 510 of the upper receiving member 500 are fixed over the first substrate 310, to fix the display panel 300.

Thus, when the first substrate 310 of the display panel 300 includes the first non-overlapping area 311 more protruded than the second substrate 320, the display panel 300 may be more easily fixed by the front case 400 and the upper receiving member 500. However, when the second substrate 320 of the display panel 300 includes the second non-overlapping area 321 more protruded than the first substrate 310, the display panel 300 may be poorly fixed by the front case 400 and the upper receiving member 500. For example, when the second substrate 320 includes the second non-overlapping area 321 more protruded than the first substrate 310, the area in which the end portion 410 of the front case 400 and the end portion 510 of the upper receiving member 500, and the first substrate 310 overlap with each other is decreased. Thus, shapes of the end portion 410 of the front case 400 and the end portion 510 of the upper receiving member 500 may be changed, and the end portion 410 of the front case and the end portion 510 of the upper receiving member 500 may be rearranged, to increase the overlapping area.

In addition, the display apparatus according to the present example embodiment may further include a first polarizing plate 710 disposed on the first substrate 310. In this case, since an area of the first polarizing plate 710 is smaller than the area of the first substrate 310, the end portion 410 of the front case 400 and the end portion 510 of the upper receiving member 500 are extended to an area in which the first polarizing plate 710 is disposed. Thus, the first polarizing plate 710 is fixed by the end portion 410 of the front case 400 and the end portion 510 of the upper receiving member 500.

In the present example embodiment as illustrated in FIG. 4, the end portion 410 of the front case 400 is disposed over the non-display area PA of the first substrate 310. In addition, the end portion 510 of the upper receiving member 500 is disposed on the non-display area PA of the first substrate 310, and the end portion 510 of the upper receiving member 500 is protruded between the end portion 410 of the front case 400 and an upper surface of the first substrate 310. Thus, the area in which the end portion 510 of the upper receiving member 500 and the first substrate 310 overlap with each other is increased, so that the display panel 300 may be fixed more safely. In addition, the end portion 510 of the upper receiving member 500 is protruded to an upper surface of the first polarizing plate 710, to overlap with a portion of the first polarizing plate 710 that is disposed on the first substrate 310, so that the end portion 510 of the upper receiving member 500 may fix both the display panel 300 and the first polarizing plate 710 more safely.

For example, the end portion 510 of the upper receiving member 500 is protruding between the end portion 410 of the front case 400 and the upper surface of the first substrate 310, so that a distance β from the display area DA of the first substrate 310 to the end portion 410 of the front case 400 is longer than a distance γ from the display area DA of the first substrate 310 to the end portion 510 of the upper receiving member 500. Thus, the area in which the end portion 510 of the upper receiving member 500 and the upper surface of the first substrate 310 overlap may be increased, and the display panel 300 may be more safely fixed from an external impact.

The end portion 410 of the front case 400 and the end portion 510 of the upper receiving member 500 may include various shapes. For example, as illustrated in FIG. 4, the end portion 410 of the front case includes a downward L shape, so that an end surface 420 of the front case 400 may face an upper surface 520 of the end portion 510 of the upper receiving member 500. In this case, the end portion 510 of the upper receiving member 500 may include an upward L shape, to correspond to the shape of the end portion 410 of the front case 400. In addition, the end portion 510 of the upper receiving member 500, the end portion 410 of the front case 400 and the first substrate 310 may be fixed with each other, so that an end surface 530 of the upper receiving member 500 extends along the first direction.

Alternatively, although not shown in the figure, the end portion 410 of the front case 400 includes a downward L shape, and the end portion 510 of the upper receiving member 500 includes a straight line shape, so that the end surface 420 of the front case 400 may be fixed to the upper surface 520 of the end portion 510 of the upper receiving member 500. In addition, both the end portion 410 of the front case 400 and the end portion 510 of the upper receiving member 500 include the straight line shape, so that the end surface 420 of the front case 400 and the end surface 530 of the upper receiving member 500 may be fixed to extend along the first direction.

As mentioned above, the end portion 510 of the upper receiving member 500 protrudes more than the end portion 410 of the front case 400 by the predetermined distance β-γ, to increase fixing ability and to provide enough space for design. When the end portion 510 of the upper receiving member is protruded to the non-display area PA of the first substrate 310, the end portion 510 of the upper receiving member 500 is required to have a substantially same color as the non-display area PA to prevent the protruded end portion 510 of the upper receiving member 500 from being noticed. For example, when a black matrix is formed on the non-display area PA of the first substrate 310, the end portion 510 of the upper receiving member 500 is required to have a black color. Thus, the protruded end portion 510 of the upper receiving member 500 is not noticed, even if the end portion 510 of the upper receiving member 500 is protruded to the non-display area PA.

For example, a black colored tape may be attached to the end portion 510 of the upper receiving member 500, so that the end portion 510 of the upper receiving member 500 has the black color. Alternatively, a powder having a black color may be coated on the end portion 510 of the upper receiving member 500, which is called as a powder coating method, so that the end portion 510 of the upper receiving member 500 has the black color. In the powder coating method, after a synthetic resin is treated to be formed as powders having a size between about 1 μm and about 100 μm, the powders are coated on a surface of metal, and then the surface of the metal is treated with a high temperature. For example, since the upper receiving member 500 includes a metal material, the end portion 510 of the upper receiving member 500 may be painted via the powder coating method.

Figure 5:
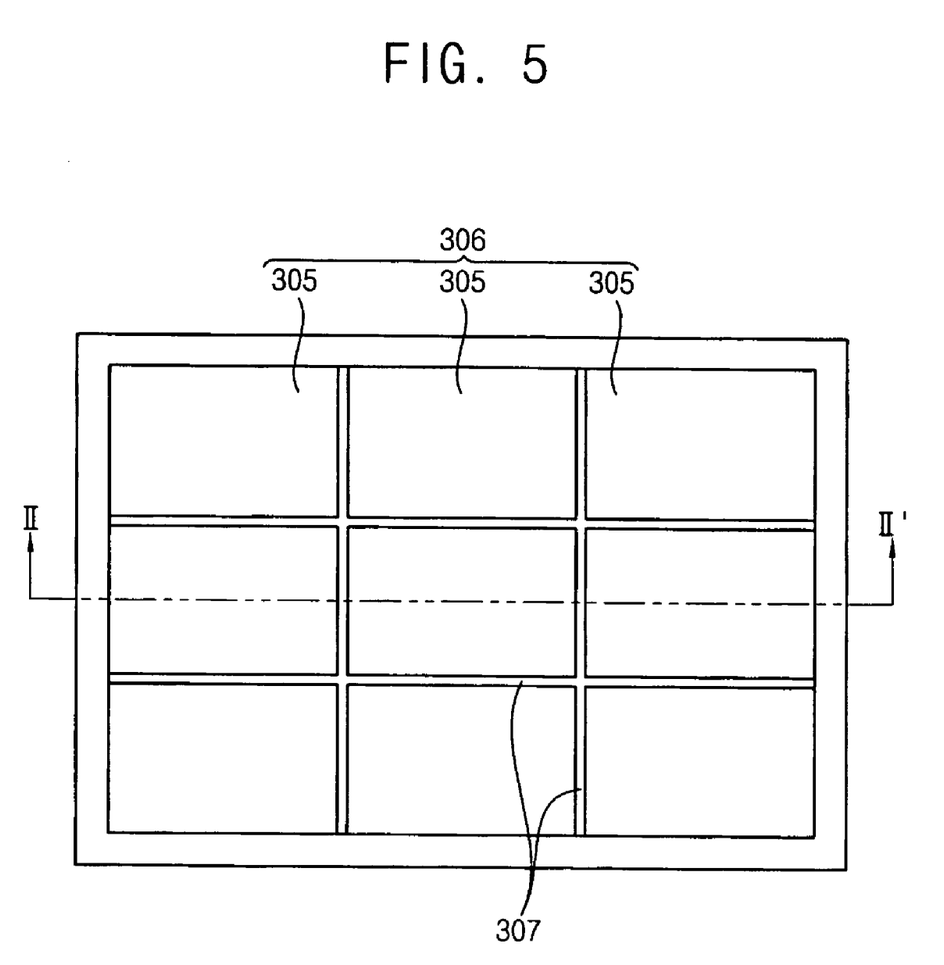
FIG. 5 is a plan view illustrating a display apparatus according to another example embodiment of the present invention.
Figure 6:
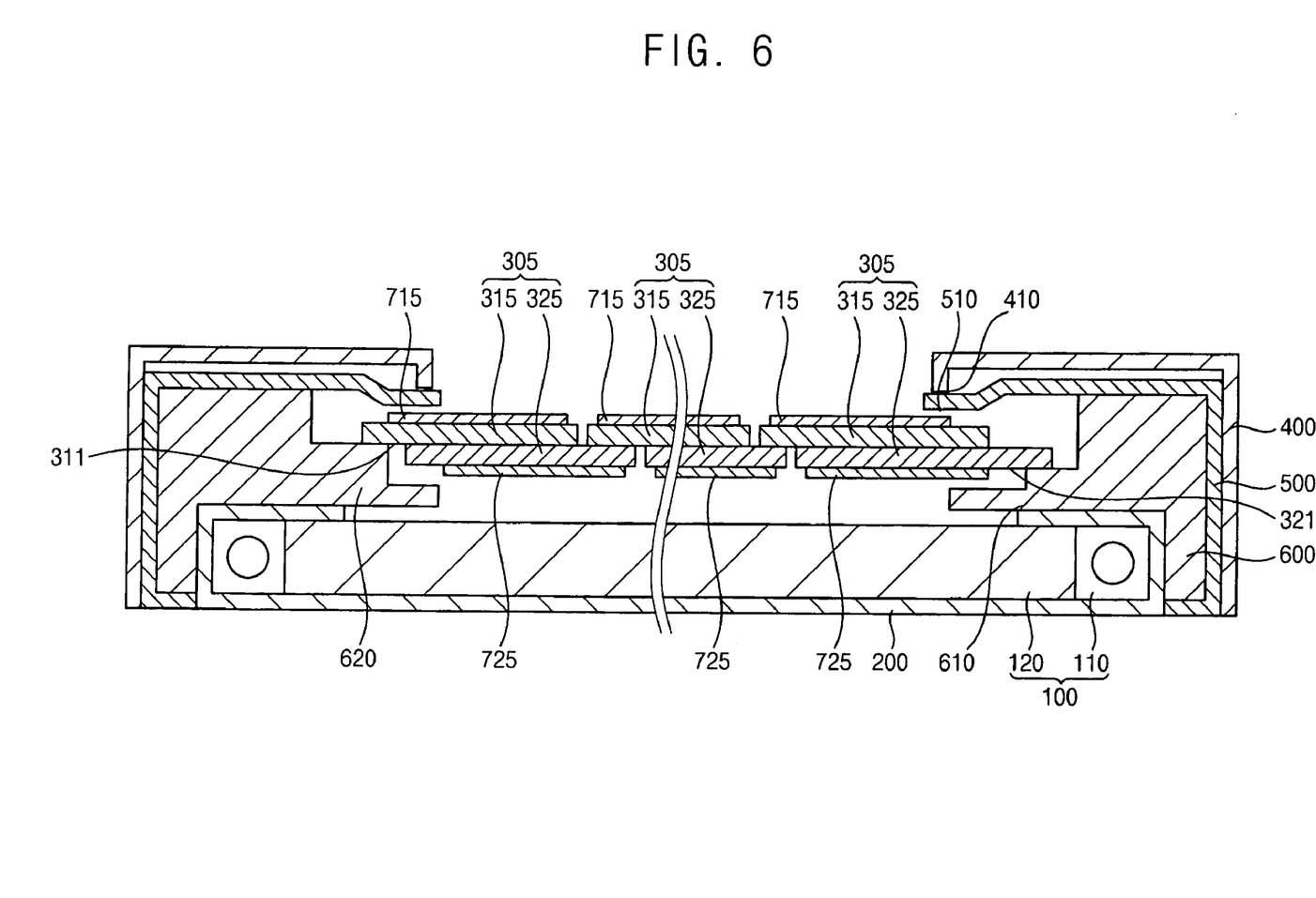
FIG. 6 is a cross-sectional view taken along a line II-II' of FIG. 5.

FIG. 5 is a plan view illustrating a display apparatus according to another example embodiment of the present invention. FIG. 6 is a cross-sectional view taken along a line II-II' of FIG. 5.

Referring to FIGS. 5 and 6, the display apparatus according to the present example embodiment includes a backlight assembly 100, a lower receiving member 200, a tiled display panel 306, a front case 400 and an upper receiving member 500. The display apparatus may further include a mold frame 600 and first and second polarizing plates 710 and 720. The display apparatus according to the present example embodiment is substantially the same as the display apparatus according the previous example embodiment as mentioned above except the tiled display panel 306. Thus, the same reference numerals will be used to refer to the same or like parts as those described in the previous example embodiment and any further repetitive explanation concerning the above elements will be omitted.

A plurality of unit display panels 305 is combined with each other, to form the tiled display panel 306. As mentioned above, each of the unit display panels 305 is manufactured by cutting the mother substrates using the cutting method, and includes a first substrate 315 and a second substrate 325. When the unit display panels 305 are combined with each other, the tiled display panel 306 is manufactured, so that a size of the display apparatus is increased. In this case, as mentioned above, each of the unit display panels 305 includes an overlapping area in which the first and second substrates 315 and 325 overlap with each other, and a non-overlapping area in which the first and second substrates 315 and 325 do not overlap with each other. The non-overlapping area of the first substrate 315 may be combined with the non-display area of the second substrate 325. For example, a lower surface of the first substrate 315 of the unit display panel 305 is combined with an upper surface of the second substrate 325 of the unit display panel 305. Thus, an area in which adjacent unit display panels 305 are combined with each other is decreased.

Accordingly, the first and second substrates 315 and 325 of the unit display panel 305, which are manufactured via the cutting method, are combined with each other, so that the non-overlapping areas of the first and second substrates 315 and 325 are offset with respect to each other, and the tiled display panel 306 is manufactured. Thus, the area of a non-display area 307 of the tiled display panel 306 is further decreased when end portions of the first and second substrates 315 and 325 of the unit display panel 305 are offset with respect to each other, than when the end portions of the first and second substrates 315 and 325 of the unit display panel 305 are in alignment with each other.

Each of the unit display panels 305 may include a first polarizing plate 715 disposed on the first substrate 315 and a second polarizing plate 725 disposed beneath the second substrate 325. In addition, the unit display panel 306 disposed at an outermost side among the unit display panels 305, and the first and second polarizing plates 715 and 725 disposed on the unit display panel 306 disposed at the outermost side, are disposed substantially same as the display panel 300, and the first and second polarizing plates 710 and 720 as explained in the previous example embodiment.

According to the present embodiment of the invention, the end portions of the first and second substrates are cut offset with respect to each other to make better use of mother substrates, so that the size of the display panel may be increased.

In addition, the end portion of the upper receiving member is protruded between the end portion of the front case and the first substrate, so that an area of the end portion of the upper receiving member disposed on the first substrate is increased. Thus, the display panel may be more safely fixed from an external impact.

In addition, the end portion of the upper receiving member has the black surface, so that the end portion of the upper receiving member may not be noticed even if the end portion of the upper receiving member is protruded between the end portion of the front case and the first substrate. Thus, an enhanced image may be provided.

Having described the example embodiments of the present invention and its advantage, it is noted that various changes, substitutions and alterations can be made herein without departing from the spirit and scope of the invention as defined by appended claims.

What is claimed is:

1. A display apparatus including a display panel having a first substrate and a second substrate disposed under the first substrate, and a front case covering the display panel, end portions of the first and second substrates being arranged offset with respect to each other, the display apparatus comprising:
   a backlight assembly providing light;
   a lower receiving member receiving the backlight assembly,
   wherein the display panel is disposed over the backlight assembly; and
   an upper receiving member combined with the lower receiving member and fixing the display panel, an end portion of the upper receiving member being disposed on a non-display area of the first substrate and protruding between an end portion of the front case and the first substrate,
   wherein the display panel includes a display area and a non-display area, and the end portion of the upper receiving member has a substantially same color as the non-display area.

2. The display apparatus of claim 1, further comprising a mold frame disposed between the lower receiving member and the upper receiving member, to support the display panel.

3. The display apparatus of claim 2, wherein the mold frame comprises a first protrusion supporting the first substrate and a second protrusion supporting the second substrate.

4. The display apparatus of claim 1, wherein the end portion of the upper receiving member protrudes so that a distance from a display area of the first substrate to the end portion of the front case is longer than the distance from the display area of the first substrate to the end portion of the upper receiving member.

5. The display apparatus of claim 4, wherein a black matrix is formed in the non-display area of the first substrate, and the end portion of the upper receiving member overlaps with the black matrix.

6. The display apparatus of claim 5, wherein the end portion of the front case has a downward L shape, so that an end surface of the front case faces an upper surface of the end portion of the upper receiving member.

7. The display apparatus of claim 6, wherein the end portion of the upper receiving member has an upward L shape, to correspond to the end portion of the front case.

8. The display apparatus of claim 7, wherein the end portion of the upper receiving member has a black surface.

9. The display apparatus of claim 8, wherein a black tape is attached to the end portion of the upper receiving member to form the black surface.

10. The display apparatus of claim 9, wherein powder is coated on the end portion of the upper receiving member to form the black surface.

11. The display apparatus of claim 1, further comprising a polarizing plate disposed on the first substrate.

12. The display apparatus of claim 11, wherein the end portion of the upper receiving member is disposed on the polarizing plate, to fix the polarizing plate and the display panel.

13. The display apparatus of claim 12, wherein the end portion of the second substrate, the end portion of the first substrate, an end portion of the polarizing plate and the end portion of the upper receiving member overlap with each other in a line.

14. The display apparatus of claim 1, wherein the front case comprises a plastic based material, and the upper receiving member comprises a metal.

15. A display apparatus including a unit display panel having a first substrate and a second substrate disposed under the first substrate, and a front case covering a plurality of unit display panels combined with each other, end portions of the first and second substrates being arranged offset with respect to each other, the display apparatus comprising:
   a backlight assembly providing light;
   a lower receiving member receiving the backlight assembly;
   a tiled display panel disposed over the backlight assembly and including the plurality of unit display panels combined with each other; and
   an upper receiving member combined with the lower receiving member and fixing the tiled display panel, end portion of the upper receiving member being disposed on a non-display area of the first substrate and protruding between an end portion of the front case and the first substrate,
   wherein the tiled display panel includes a display area and a non-display area, and the end portion of the upper receiving member has a substantially same color as the non-display area.

16. The display apparatus of claim 15, wherein the first substrate of the unit display panel is disposed on the second substrate of adjacent unit display panel, to form the tiled display panel.

17. The display apparatus of claim 16, further comprising a mold frame disposed between the lower and upper receiving members and including a first protrusion and a second protrusion, the first protrusion supporting the first substrate of a first outermost unit display panel, the second protrusion supporting the second substrate of a second outermost unit display panel, the first outermost unit display panel being opposite to the second outermost unit display panel.

18. The display apparatus of claim 15, wherein the end portion of the upper receiving member protrudes, so that a distance from a display area of the first outermost unit display panel to the end portion of the front case is longer than the distance from the display area of the first outermost unit display panel to the end portion of the upper receiving member.

19. The display apparatus of claim 18, wherein a black matrix is formed in the non-display area of the first substrate of the first outermost unit display panel, and the end portion of the upper receiving member overlaps with the black matrix.

20. A method for assembling a display apparatus, the display apparatus including a display panel having a first substrate and a second substrate disposed under the first substrate, and a front case covering the display panel, end portions of the first and second substrates being cut offset with respect to each other, the method comprising:

receiving a backlight assembly in a lower receiving member;

disposing the display panel over the backlight assembly;

combining an upper receiving member with the lower receiving member;

disposing an end portion of the upper receiving member on a non-display area of the first substrate, to fix the display panel using the upper receiving member; and disposing an end portion of the front case over the non-display area of the first substrate, so that the end portion of the upper receiving member protrudes between the end portion of the front case and the first substrate, wherein the display panel includes a display area and a non-display area, and the end portion of the upper receiving member has a substantially same color as the non-display area.

21. The method of claim 20, further comprising disposing a mold frame having a first protrusion supporting the first substrate and a second protrusion supporting the second protrusion between the lower receiving member and the upper receiving member.

22. The method of claim 20, wherein the end portion of the front case is disposed over the non-display area of the first substrate by forming a distance from a display area of the first substrate to the end portion of the front case to be longer than the distance from the display area of the first substrate to the end portion of the upper receiving member.

23. The method of claim 22, wherein the end portion of the front case is disposed over the non-display area of the first substrate by disposing an end surface of the front case to face an upper surface of the end portion of the upper receiving member.

24. The method of claim 20, further comprising disposing a polarizing plate on the first substrate.

25. The method of claim 24, wherein the display panel is fixed using the upper receiving member by disposing the end portion of the upper receiving member on the polarizing plate.

\* \* \* \* \*